UNITED STATES PATENT OFFICE.

JOHN P. SHEPHERD, OF CHICAGO, ILLINOIS, ASSIGNOR, BY MESNE ASSIGNMENTS, TO SHEPHERD CHEMICAL COMPANY, A CORPORATION OF ILLINOIS.

OINTMENT.

1,383,493. Specification of Letters Patent. Patented July 5, 1921.

No Drawing. Application filed January 24, 1920. Serial No. 353,816.

*To all whom it may concern:*

Be it known that I, JOHN P. SHEPHERD, a citizen of the United States, and a resident of the city of Chicago, in the county of Cook and State of Illinois, have invented certain new and useful Improvements in an Ointment; and I do hereby declare that the following is a full, clear, and exact description of the same.

This invention relates to ointments adapted to be applied to burns, cuts, diseased skin areas and any place where an antiseptic, soothing and skin building substance is required.

One of the best substances known for treatment of bruises, cuts or burns is iodin. Ordinarily this is applied as a tincture or alcoholic solution of equal parts of iodin and potassium iodid. Used in this way the iodin produces an unsightly discoloration which takes several days to disappear.

One of the objects of the present invention is to provide an ointment containing free iodin which is absorbed in a few minutes without leaving the characteristic purple color of iodin on the skin to which it is applied.

Another object of the invention is to provide an improved ointment capable of being absorbed by the skin with a maximum of rapidity.

I have found that, if cholesterin is used as the base of the iodin ointment, the iodin is carried into the pores of the skin with the cholesterin and leaves no discoloration on the surface.

As is usual in pharmacy where iodin is used I prefer to employ a mixture of substantially equal parts of free iodin and potassium iodid since the latter appears to aid in the solution and absorption of the free iodin.

I have also discovered that it is advantageous to add an unguent, particularly one which is non-decomposable under all ordinary conditions. One of the most suitable materials for this purpose is petrolatum or vaseline.

According to the preferred steps of the process iodin, potassium iodid and water are mixed together to form a solution which is then thoroughly stirred into a previously prepared mixture of dry cholesterin powder and petrolatum.

As an example of proportions suitable for preparing the improved ointment the following may be given:

|  | Per cent. |
|---|---|
| Free iodin | 4 |
| Potassium iodid | 4 |
| Water | 4 |
| Petrolatum | 9 |
| Cholesterin | 79 |
|  | 100 |

The cholesterin employed may be prepared in any suitable way, although I prefer to obtain it from spermaceti by saponifying the glycerids with an alkali ethylate and washing the resulting soluble products from the insoluble cholesterin. The cholesterin so prepared contains some of the original waxes of the spermaceti and is, therefore, superior as an ointment to the chemically pure product.

Further, cholesterin may be used to form ointments with other antiseptic, medicinal and other substances on account of the ease with which it is absorbed by the skin.

While I have described my invention in a preferred form, I am aware that various changes and modifications may be made in the ingredients employed and the proportions and manner in which they are mixed without departing from the principles of my invention, and I do not therefore purpose limiting the patent granted hereon otherwise than as necessitated by the prior art.

I claim as my invention:

1. An ointment comprising a small amount of free iodin and a preponderating proportion of free cholesterin.

2. An ointment comprising small amounts of free iodin and an iodid, an unguent and a cholesterin product consisting chiefly of free cholesterin.

3. An ointment comprising approximately 4% free iodin, 4% potassium iodid, 4% water, 9% petrolatum and 79% cholesterin.

4. An ointment containing cholesterin, free iodin, and water which water materially increases the iodin holding capacity of the cholesterin.

5. An ointment containing petrolatum, free iodin, water, and cholesterin in which the cholesterin aided by the water, materially increases the iodin holding capacity of the petrolatum.

In testimony whereof I have hereunto subscribed my name in the presence of two subscribing witnesses.

JOHN P. SHEPHERD.

Witnesses:
RIDSDALE ELLIS,
EARL M. HARDINE.